United States Patent [19]

Layman et al.

[11] Patent Number: 5,025,628
[45] Date of Patent: Jun. 25, 1991

[54] MASTER CYLINDER RESERVOIR DIAPHRAGM VENTING ARRANGEMENT

[75] Inventors: John C. Layman, Union; Cecil C. Pugh, Kettering, both of Ohio

[73] Assignee: General Motors Corporation, Detroit, Mich.

[21] Appl. No.: 386,467

[22] Filed: Jul. 27, 1989

[51] Int. Cl.$^5$ .............................................. B60T 11/26
[52] U.S. Cl. ...................................................... 60/585
[58] Field of Search ...................... 60/533, 585; 92/142

[56] References Cited

U.S. PATENT DOCUMENTS

| | | | |
|---|---|---|---|
| 3,023,924 | 3/1962 | Boyer | 60/585 X |
| 4,393,655 | 7/1983 | Komorizono | 60/585 |
| 4,514,984 | 5/1985 | Kubota | 60/585 |

Primary Examiner—Edward K. Look
Assistant Examiner—George Kapsalas
Attorney, Agent, or Firm—Ernest E. Helms

[57] ABSTRACT

A brake master cylinder reservoir diaphragm has a vent slit therein to operate as a vent valve to equalize air pressure when a pressure differential is impressed across the diaphragm as the brake fluid level in the reservoir changes. The vent slit has an omega or bell curve shape so that the movable valve member is the tongue-like part formed on the inner curvilinear part of the curved vent slit. The tongue valve member acts as a cantilever supported valve which bends at its base to open in either direction under a differential pressure acting on one side or the other of the diaphragm. The opening and closing action of the tongue valve member can be fine tuned by modifying the bending resistance of the base of that member. Such modifications can include a partial base slit extending only part way into the thickness of the base to form a groove in alignment with the straight ends of the omega slit and located between them. Such a groove may be provided on one or both sides of the base, and the depth and length of any such groove can be controlled to fine tune the bending characteristics of the base. The base slit may also be formed entirely through the diaphragm material. The length of the straight ends of the omega slit may also be changed to have a modifying effect on the base bending characteristics.

11 Claims, 3 Drawing Sheets

MASTER CYLINDER RESERVOIR DIAPHRAGM VENTING ARRANGEMENT

FIELD OF THE INVENTION

Master cylinder reservoirs having a diaphragm positioned between the reservoir housing top and the reservoir cap are commonly vented on one side of the diaphragm to atmosphere, and exposed to the brake fluid and some entrapped air on the other side of the diaphragm. The diaphragm is sufficiently flexible to move with changes in brake fluid level as fluid compensation takes place during brake operation. At times the diaphragm has a vent opening in it, formed by a small, straight slit, to permit the flow of small quantities of air into or out of the reservoir area immediately above the level of the brake fluid but below the diaphragm so as to limit the changes in pressure in the reservoir to a predetermined pressure range on either side of ambient air pressure.

DESCRIPTION OF RELATED ART

U.S. Pat. No. 3,070,058-Boyer is an example of a diaphragm having a small slit for venting purposes. Similar vents are also shown in U.S. Pat. Applications Ser. Nos. 07/348,929 and 07/331,999, filed on May 8, 1989 and Apr. 3, 1989, respectively, and assigned to the common assignee. In each of these disclosures the vent is a small, straight line slit made through the diaphragm. In the patent applications noted, the slit is located in the bottom of a circular cup-shaped depression in the diaphragm formed by a molded raised fold or convolution. The diaphragm must have a pressure differential exerted across it which is sufficient to stretch the diaphragm in the area of the slit and open the slit in order for air to vent through the slit from the side of the diaphragm having the higher air pressure thereon to the side having the lower air pressure thereon.

SUMMARY OF THE INVENTION

A master cylinder diaphragm is provided with a curvilinear slit configured somewhat like a bell curve or the Greek letter omega For ease of differentiation it will be hereafter referred to as an omega slit. This slit defines a tongue-like, cantilever supported, movable flap vent or valve. The vent flap or tongue valve member opens under differential pressure by resilient cantilever bending of the valve member at its base and requires no stretching of the diaphragm around the slit as does the straight slit of the related art described above The tongue valve member has a normally closed position due to the inherent resiliency of the diaphragm material from which it is created and its tendency to return to the plane of the diaphragm from which is cut. It will open for air flow through it in either direction when a small differential pressure on the order of 0.5 p.s.i. or even less is impressed across the diaphragm.

DETAILED DESCRIPTION OF THE PREFERRED EMBODIMENT

Figure 4:
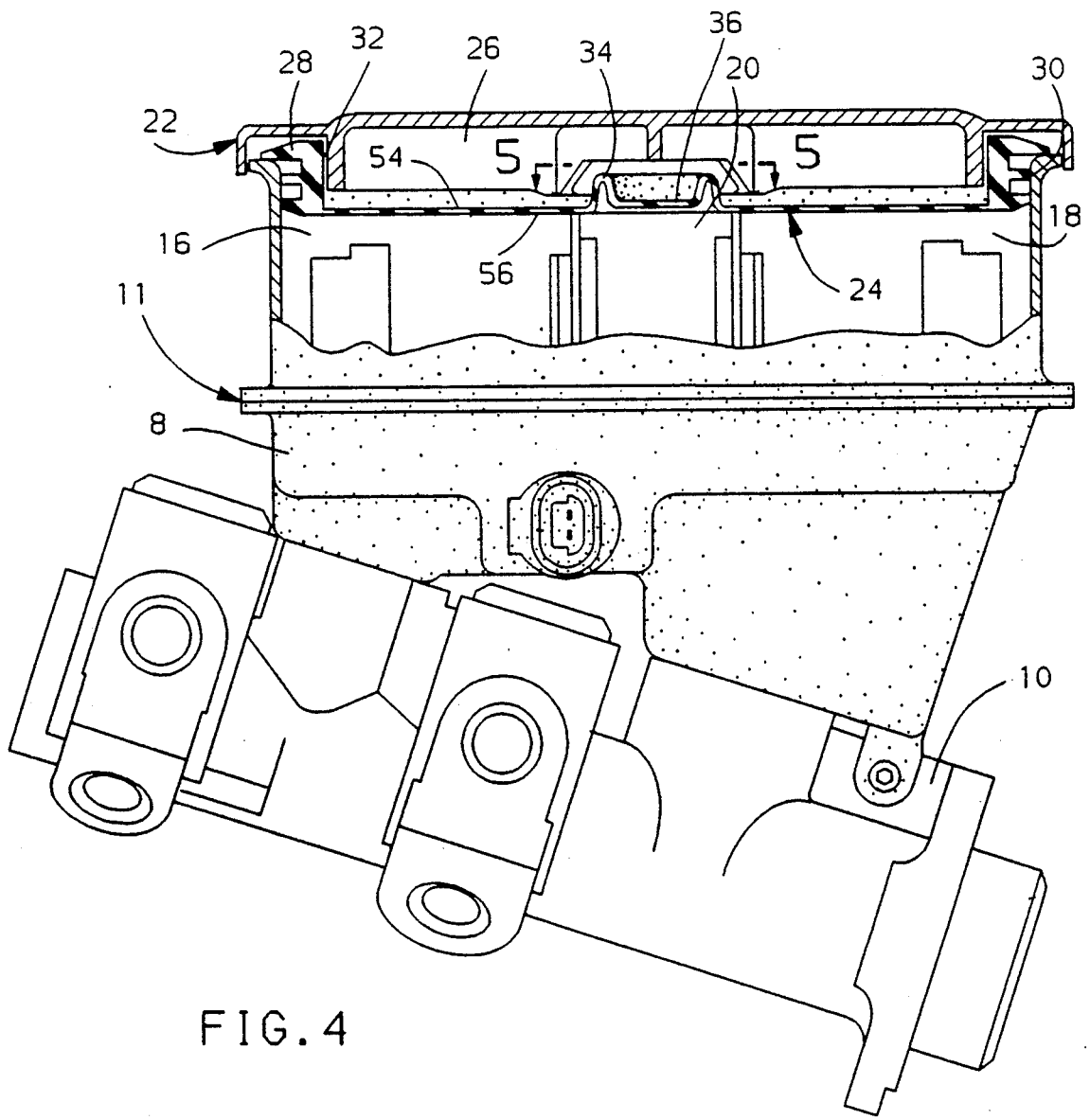

Referring to FIG. 4, the master cylinder reservoir 11 includes a reservoir housing 8 mounted on the main body of the master cylinder 10 in a manner well known in the art. The reservoir 8 has a front reservoir section 16 and a rear reservoir section 18 separated by a fluid level sensor section 20. A cover 22 is mounted on the top of the reservoir housing and secured in place. The reservoir diaphragm 24 is mounted on the top of the reservoir housing and is secured in place by the cover 22. There is therefore a fluid reservoir chamber on the underside of the diaphragm formed by the reservoir sections 16, 18 and 20, and an upper chamber 26 defined by the cover 22 and the diaphragm 24. The diaphragm 24 has an edge wall construction 28 which cooperates with the reservoir housing 12 and the cover 22 to provide a seal between the diaphragm and the reservoir housing at 30 and a vent passageway 32 connected to atmosphere. Thus the upper chamber 26 is continually vented to atmosphere through passageway 32.

The center portion of diaphragm 24 located over the fluid level sensor section 20 has a raised convolution formed as a part of the diaphragm and forming an annular dam or wall 34 about a portion 36 of the diaphragm. As is better seen in FIGS. 5 and 6, the diaphragm portion 36 has an omega slit 38 cut through it. The omega slit has aligned ends 40 and 42 and a curvilinear portion 44 joining the ends. The curvilinear portion of the slit defines a tongue-like vent valve member 46 which is a flapper valve. The base 48 of the tongue valve member 46 joins the main portion of the diaphragm between the slit ends 40 and 42 at the base 48 of member 46. Base 48 acts as a resilient hinge for the tongue valve member. The outer edge surface of the slit 38 forms a valve seat 50 for the tongue valve member 46. In normal conditions under which there is no substantial differential pressure acting across the diaphragm, the valve is closed. The tongue valve member 46 is in planar alignment with the surrounding portion 36 of the diaphragm 24 so that its edge surface 52 is in seating contact with the edge surface forming valve seat 50. The valve is then in the closed position.

Figure 6:
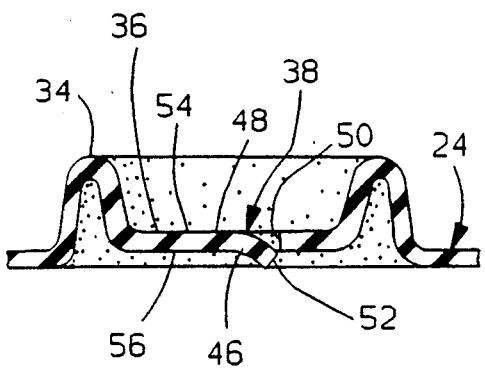
FIG. 6 is a view taken along line 6—6 of FIG. 5.

When a differential air pressure is exerted across the diaphragm 24, that pressure acts on the area of the tongue valve member 46 exposed to the higher pressure, causing the tongue valve member to bend in cantilever fashion. As shown in FIG. 6, the higher pressure is on the upper side 54 of the diaphragm, opening the vent valve by moving the tongue valve member 46 downwardly. This allows air at atmospheric pressure in the upper chamber 26 to flow through the vent valve into the lower chamber of the reservoir. As soon as the pressure is equalized in the two chambers, the resilient nature of the tongue valve member 46 returns it to the closed position.

A phenomenon which was quite unexpected has been found to occur which gives superior pressure equalization as the level of brake fluid in the reservoir changes rapidly under conditions such as the rupture of one of the brake circuits to which the master cylinder is attached. The pressure in the lower chamber is more quickly equalized when a diaphragm employing the invention is used than when there is no diaphragm at all. This is believed to occur due to a pumping action of the diaphragm 24 in a pulsing manner as one reservoir section, section 18 for example, quickly loses its brake fluid. This is advantageous since the pressure change before equalization is kept smaller than otherwise, and the brake fluid in the other reservoir section, section 16 for example, is not subjected to a larger deviation below atmospheric pressure than is the case when equalization occurs more slowly.

When some brake fluid has been removed from one or both of the reservoir sections 16 and 18, and therefore also from section 20, as fluid for compensation has been required during a quick brake release, for example, the vent valve operates to permit atmospheric air flow into the lower reservoir chamber from the upper chamber 26. Shortly thereafter, the fluid is returned to the reservoir, and the lower chamber then has the higher air pressure acting on the under side 56 of the diaphragm. This causes the valve to open in the other direction, with the tongue valve member 46 moving upwardly rather than downwardly as earlier described. Again, this requires no stretching of the portion 36 of the diaphragm 24 surrounding the omega slit 38, as is the case with a straight slit, and the valve opens more quickly at a lower differential pressure. It has been found in a typical installation that it will require no more than 0.5 p.s.i. to open the valve for substantially full air flow through it until the pressures on opposite sides of the diaphragm are again equalized.

The tongue valve member 46 cooperates with its valve seat 50 so that there is little or no leakage of brake fluid through the valve. However, if a small amount passing through the omega slit 38, usually in a mist form, does collect on upper side 54 of the diaphragm, it will usually be contained within the diaphragm convolution forming the dam or wall 34 and will not spread to other parts of the diaphragm before it is removed. Any such brake fluid contained in wall 34 will tend to flow back into the lower chamber of the fluid reservoir housing 12 when the valve is opened in response to a differential pressure acting across the diaphragm with the higher pressure being on the upper side 54 thereof so that air and brake fluid flow takes place through the valve toward the lower reservoir chamber.

Figure 7:
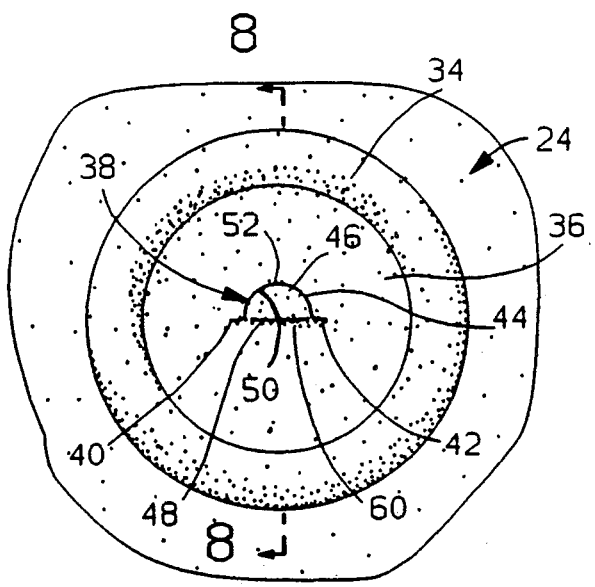
FIG. 7 is a view similar to FIG. 5 showing a modification of the vent valve construction.
Figure 8:
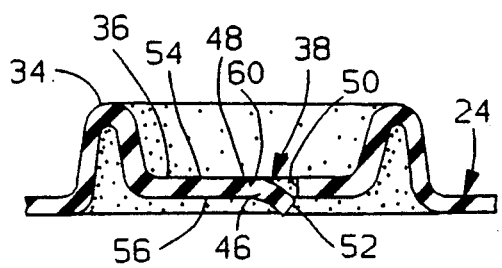
FIG. 8 is a view taken along line 8—8 of FIG. 7.

In some instances, a thicker diaphragm may be employed than is necessary insofar as desired valve opening operation of the tongue valve member 46 is concerned. It can be appreciated that the thicker the base 48, the stiffer the tongue valve member with the same durometer diaphragm, and the greater differential pressure then needed to open the valve. FIGS. 8 and 7 show a modification that obviates this problem while obtaining yet another advantage. A groove or slit 60 is created along base 48 between the omega slit ends 40 and 42 in aligned but spaced relation to those ends. When the slit is only part way through the diaphragm material, it is referred to herein as a groove. When it is entirely through the diaphragm material, it is referred to as a slit.

The construction in which 60 is a groove has some particular advantages under certain conditions. The groove is formed by a partial slit which extends from the upper side 54 of the diaphragm 24 only part way through the base thickness. When the higher pressure in upper chamber 26 acts on the tongue valve member 46, that member bends more easily than it would if the groove 60 is not provided. Therefore the valve opens at a lower differential pressure than is the case when no groove 60 is present. When the higher pressure is on the lower side of the diaphragm 24, however, the tongue valve member 46 will not open until a slightly higher differential pressure is exerted across the diaphragm than that just described. This occurs because there is no groove on the under side of the base 48, and the groove sides, being normally in abutting contact with each other, do not permit the tongue valve member 46 to bend as easily at its base.

Figure 5:
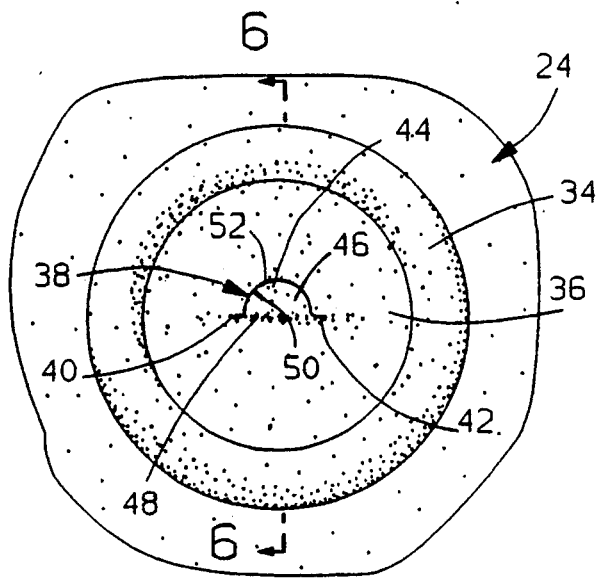
FIG. 5 is a fragmentary top plan view of the diaphragm and vent valve of FIG. 4.

Thus the valve can be fine tuned to open in one direction at one differential pressure and in the other direction at a slightly different differential pressure. It is often desirable to have the valve open downwardly, as shown in FIG. 5, at a lesser differential pressure than that which will open it upwardly. This arrangement will keep the possibility of an undesirable partial vacuum being created in the lower chamber below the diaphragm, but will lessen the tendency of any brake fluid being passed through the valve when the valve is to open upwardly by requiring a slightly greater differential pressure to so open the valve.

By controlling the length of groove 60, the amount of flexure of the tongue valve member at the base can be further controlled. A shorter groove length will result in a stiffer base than one of a longer groove length having the same groove depth. Also, changes in the length of the aligned ends 40 and 42 of the omega slit 38 will modify the amount of flexure of the tongue valve member 46 at its base 48. Longer aligned slit ends 40 and 42 will permit slightly greater flexure than shorter aligned ends.

Fine tuning of the action of the valve can therefore be accomplished through the control of groove depth, groove length, and/or lengths of the aligned ends of the omega slit.

If it is desired that a thicker diaphragm be used, but that the valve open in either direction at the same differential pressure which opened the valve with a thinner diaphragm, grooves of equal length and depth can be provided on both sides of the tongue valve member base 48 so that the same flexure characteristics are obtained in either direction of valve opening. If the grooves are replaced by a slit entirely through the material, as above defined, the slit will substantially decrease the base's resistance to bending and render the valve sensitive to very low differential pressures even though the diaphragm material from which it is made is not otherwise easily bent at the base. As discussed above with regard to the groove or grooves, the length of the slit can also be used to fine tune the valve action.

While it is preferable that the slit 38 have the general shape of the Greek letter omega, it is to be understood that it may have any reasonable modification of that shape which will maintain the same functions. For example, the curvilinear shape of the slit 38 may be somewhat more squared off, or the tongue width and length characteristics may be varied to obtain modified versions of the omega or bell curve shown in the drawing. Slit 38 may have a more classical omega shape, in which the tongue portion 46 is more circular, with a smaller base 48 formed by having the aligned ends 40 and 42 more closely approach each other. This will also render the base more flexible and therefore the valve more sensitive to small differential pressures.

Figure 1:
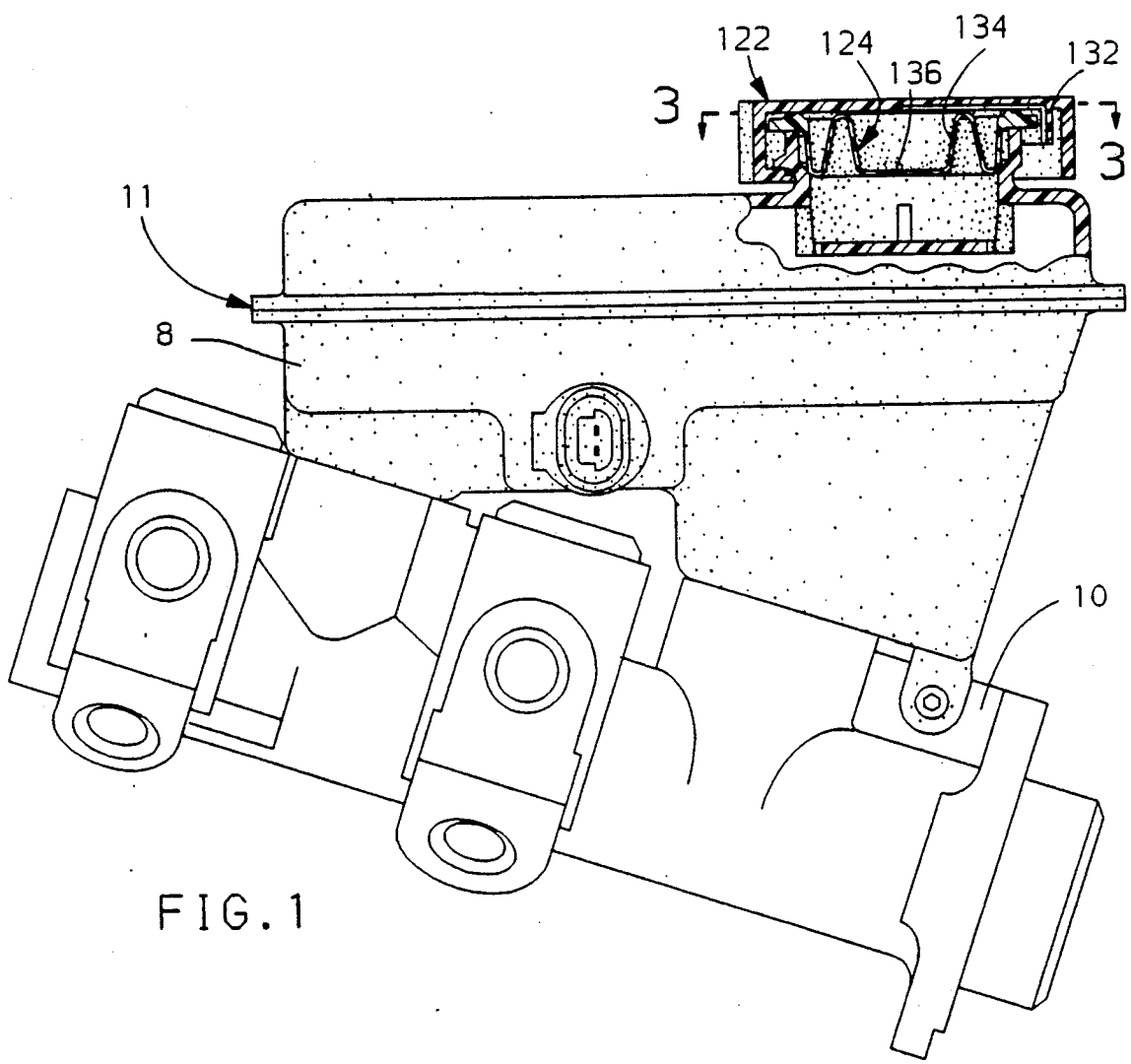
FIGS. 1 and 4 are cross section views of the reservoir and a portion of the master cylinder, showing reservoir diaphragms embodying the invention.
Figure 2:
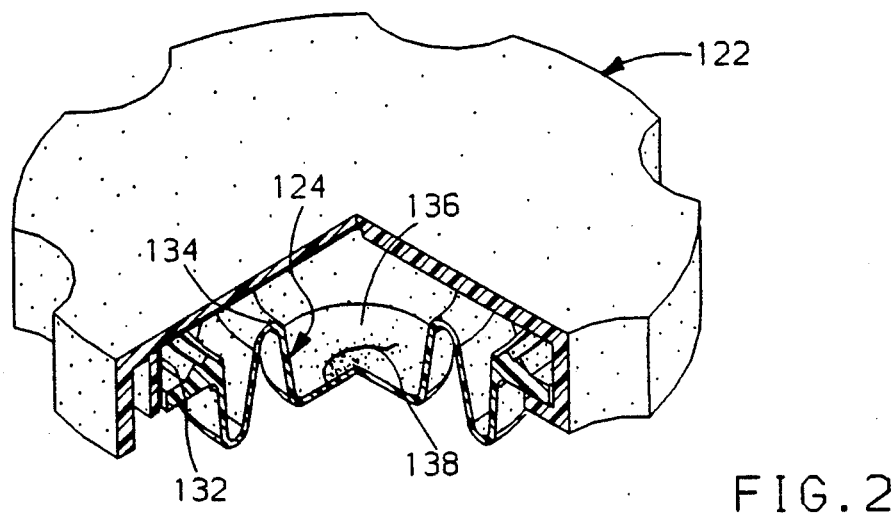
FIG. 2 is a sectional perspective view of the reservoir diaphragm of FIG. 1.
Figure 3:
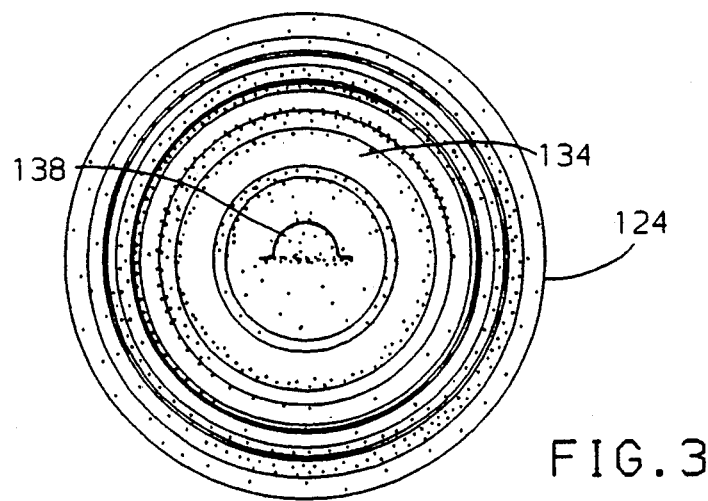
FIG. 3 is a top plan view of the diaphragm and vent valve of FIG. 1.

Referring to FIGS. 1, 2 and 3, the present invention is shown in the embodiment of a screw type vented reservoir cap 122 with a diaphragm 124 with a portion 136 surrounded by a dam 134. The cap 122 in cooperation with the diaphragm 124 form a vent passage 132 from the area above the diaphragm to the atmosphere. Omega slit 138 functions in a manner as previously described for slit 38.

While a few of the embodiments of the present invention have been explained, it will be readily apparent to those skilled in the art of the various modifications which can be made to the present invention without departing from the spirit and scope of this application as it is encompassed by the following claims.

We claim:

1. In a brake master cylinder, a reservoir housing having a cover and a diaphragm sealingly engaging said reservoir housing, said cover and said diaphragm defining an upper chamber continually vented to ambient air, and said reservoir housing and said diaphragm defining a lower chamber normally containing brake fluid and an air pocket between the upper surface of said brake fluid and the lower side of said diaphragm, and a normally closed vent slit in said diaphragm defining a vent valve to limit the differential pressure acting across said diaphragm in either direction during master cylinder operation, the improvement comprising:

said vent slit being an omega slit cut through said diaphragm, and said vent valve including a tongue valve member formed from a portion of said diaphragm by the curvilinear portion of said omega slit, said tongue valve member having a base forming a resilient hinge for said tongue valve member, said base bending to permit movement of said tongue valve member in a cantilever manner in response to a differential pressure to open said valve, and returning said tongue valve member to close said omega slit when the pressures on opposite sides of said diaphragm become substantially equalized.

2. The improved omega slit valve of claim 1 in which the bending resistance of said base is modified by selecting the aligned lengths of said aligned ends of said omega slit with longer lengths decreasing the bending resistance of said base.

3. The improved omega slit valve of claim 1 in which the bending resistance of said base is modified and controlled by providing at least one slit in said base extending only part way through the thickness of said diaphragm from one side of said diaphragm to form a groove on at least one side of said diaphragm at said base.

4. The improved omega slit valve of claim 3 in which the bending resistance of said base is modified by selecting the length of said at least one groove.

5. The improved omega slit valve of claim 3 in which the bending resistance of said base is modified by selecting the depth of said at least one groove.

6. The improved omega slit valve of claim 3 in which the bending resistance of said base is modified by providing only one groove on only one side of said diaphragm so that said base offers less bending resistance in one direction of tongue valve member cantilever movement and more bending resistance in the other direction of tongue valve member cantilever movement.

7. The improved omega slit valve of claim 1 in which the bending resistance of said base is modified and controlled by providing a slit in said base extending through the thickness of said diaphragm from one side of said diaphragm to the other side of said diaphragm, said slit being axially aligned with said aligned ends of said omega slit and axially spaced therefrom between said aligned ends.

8. A double acting vent valve in a diaphragm periodically subjected to differential pressures acting across the diaphragm in either direction, said diaphragm being made of a rubber-like resilient material, said valve comprising:

a tongue valve member having an edge surface and a base defined by one side of a curvilinear slit having spaced aligned ends separated by a curved slit section to form an omega slit, said base being that portion of said tongue valve member between said slit ends;

and a valve seat defined by the other side of said omega slit and cooperating with said tongue valve member when said valve is closed by edge surface contact of said tongue valve member and said valve seat;

said tongue valve member base forming a resilient hinge for said tongue valve member so that said tongue valve member acts as a cantilever flapper valve movable on either side of said diaphragm away from said valve seat to provide a valve opening through said omega slit, the side of said diaphragm to which said tongue valve member moves being the side having the lower pressure of the differential pressures impressed across said diaphragm.

9. The improved omega slit vent valve of claim 8 in which the bending resistance of said base is modified by means effectively decreasing the thickness of said base in relation to the thickness of said tongue valve member and the portion of said diaphragm from which said valve is formed.

10. The improved omega slit vent valve of claim 9 in which said means effectively decreasing the thickness of said base includes a slit forming a groove extending only part way through the base thickness from one side of said diaphragm.

11. The improved omega slit vent valve of claim 9 in which said base includes a slit extending through from one diaphragm side to the other diaphragm side and positioned in axially aligned and spaced relation between said aligned ends of said omega slit.

* * * * *